United States Patent
Brock et al.

(10) Patent No.: US 6,866,058 B1
(45) Date of Patent: Mar. 15, 2005

(54) FUEL TANK VENT SYSTEM WITH LIQUID FUEL FILTER

(75) Inventors: Michael S. Brock, Connersville, IN (US); J Bradley Groom, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/462,185

(22) Filed: Jun. 16, 2003

Related U.S. Application Data (63) Continuation-in-part of application No. 10/094,058, filed on Mar. 8, 2002, now Pat. No. 6,578,597.
(60) Provisional application No. 60/274,334, filed on Mar. 8, 2001.

(51) Int. Cl.[7] ............................................. F16K 24/04
(52) U.S. Cl. ......................................... 137/202; 137/43
(58) Field of Search ................................... 137/43, 202

(56) References Cited

U.S. PATENT DOCUMENTS

| | | | |
|---|---|---|---|
| 4,487,215 A | 12/1984 | Green | |
| 4,524,951 A | 6/1985 | Green et al. | |
| 4,679,581 A | * 7/1987 | Mears | ........................ 137/202 |
| 4,702,268 A | 10/1987 | Ambruster et al. | |
| 4,753,262 A | 6/1988 | Bergsma | |
| 4,790,349 A | 12/1988 | Harris | |
| 4,836,835 A | 6/1989 | Harris et al. | |
| 4,886,089 A | 12/1989 | Gabrlik et al. | |
| 4,944,779 A | 7/1990 | Szlaga et al. | |
| 4,966,189 A | 10/1990 | Harris | |
| 4,982,757 A | 1/1991 | Ohasi et al. | |
| 5,028,244 A | 7/1991 | Szlaga | |
| 5,449,029 A | 9/1995 | Harris | |
| 5,518,018 A | 5/1996 | Roetker | |
| 5,535,772 A | 7/1996 | Roetker et al. | |
| 5,564,520 A | 10/1996 | Forsythe | |
| 5,566,705 A | 10/1996 | Harris | |
| 5,590,697 A | 1/1997 | Benjey et al. | |
| 5,590,736 A | 1/1997 | Morris et al. | |
| 5,687,753 A | * 11/1997 | Doll | ............................ 137/43 |
| 5,694,968 A | 12/1997 | Devall et al. | |
| 5,755,252 A | 5/1998 | Bergsma et al. | |
| 5,860,458 A | 1/1999 | Benjey et al. | |
| 5,960,816 A | 10/1999 | Mills et al. | |
| 5,983,958 A | 11/1999 | Bergsma et al. | |
| 6,035,884 A | 3/2000 | King et al. | |
| 6,062,276 A | 5/2000 | Benjey et al. | |
| 6,085,771 A | 7/2000 | Benjey et al. | |
| 6,311,675 B2 | 11/2001 | Crary et al. | |

OTHER PUBLICATIONS

Five photo images of device from G.T. Products, Inc. (May 9, 2003).

* cited by examiner

*Primary Examiner*—Gerald A. Michalsky
(74) *Attorney, Agent, or Firm*—Barnes & Thornburg LLP (57) ABSTRACT

A fuel tank vent apparatus comprises a housing. The housing comprises inner and outer sleeves providing a fuel vapor transfer passageway therebetween so that liquid fuel entrained in fuel vapor is shed therefrom as fuel vapor flows from a fuel vapor transfer port formed in the outer sleeve through the fuel vapor transfer passageway to a fuel vapor inlet port formed in the inner sleeve to produce a flow of demoisturized fuel vapor for discharge from the housing.

20 Claims, 6 Drawing Sheets

FUEL TANK VENT SYSTEM WITH LIQUID FUEL FILTER

This application claims priority under 35 U.S.C. 120 as a continuation-in-part to U.S. application Ser. No. 10/094,058, filed Mar. 8, 2002, now U.S. Pat. No. 6,578,597 which is expressly incorporated by reference herein and claims priority to U.S. Provisional Application No. 60/274,334, filed Mar. 8, 2001, which is expressly incorporated by reference herein.

BACKGROUND

The present disclosure relates to fuel tank valve apparatus, and particularly to a liquid fuel filter for use with a fuel vapor vent system in a fuel tank. More particularly, the present disclosure relates to a system for venting fuel vapor from a tank to a vapor recovery canister without excessive carryover of liquid fuel from the tank to the canister.

Vehicle fuel systems include tank-mounted valves for venting pressurized or displaced fuel vapor from the vapor space in a fuel tank to a vapor recovery canister located outside of the fuel tank. The canister is designed to capture and store fuel entrained in fuel vapors that are displaced and generated in the fuel tank during a typical vehicle refueling operation or that are otherwise vented from the fuel tank.

However, it is not desirable to discharge excessive amounts of liquid fuel into the vapor recovery canister. This is especially true during "maneuvering" of fuel tank vapor control apparatus mounted on a moving fuel tank of the type that occurs during "dynamic" testing of such vapor control apparatus. It is therefore desirable to minimize the amount of liquid fuel carryover from the fuel tank to the vapor recovery canister of the type that might occur during dynamic testing or other vehicle operation.

SUMMARY

According to the present disclosure, a fuel tank vent apparatus is provided. The fuel tank vent apparatus is configured to vent fuel vapor from a fuel tank while minimizing the amount of liquid fuel carryover from the fuel tank. The fuel tank vent apparatus includes a housing and a valve mounted in the housing for movement to open and close a fuel vapor outlet port.

The housing is configured to demoisturize fuel vapor before the fuel vapor is discharged from the housing through the fuel vapor outlet port. The housing includes outer and inner sleeves that define a fuel vapor transfer passageway therebetween. Liquid fuel is shed from fuel vapor as fuel vapor flows from a vapor space in the fuel tank laterally through a fuel vapor transfer port formed in the outer sleeve into the fuel vapor transfer passageway, upwardly and circumferentially about a central axis of the housing away from the fuel vapor transfer port, and laterally through a fuel vapor inlet port formed in the inner sleeve into a valve chamber containing the valve for discharge of demoisturized fuel vapor through the fuel vapor outlet port.

Additional features and advantages of the apparatus will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which.

DETAILED DESCRIPTION

Figure 1:
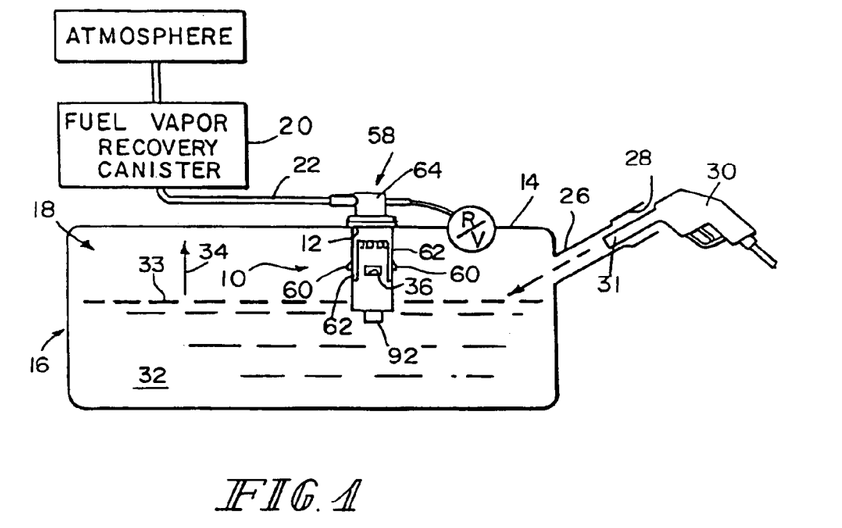
FIG. 1 is a diagrammatic view of a fuel tank during refueling and a fuel vapor recovery canister outside the tank and showing a vent apparatus mounted in the top wall of the fuel tank and coupled to the canister and to a rollover valve unit (having symbol "R/V") also mounted in the top wall of the fuel tank.
Figure 2:
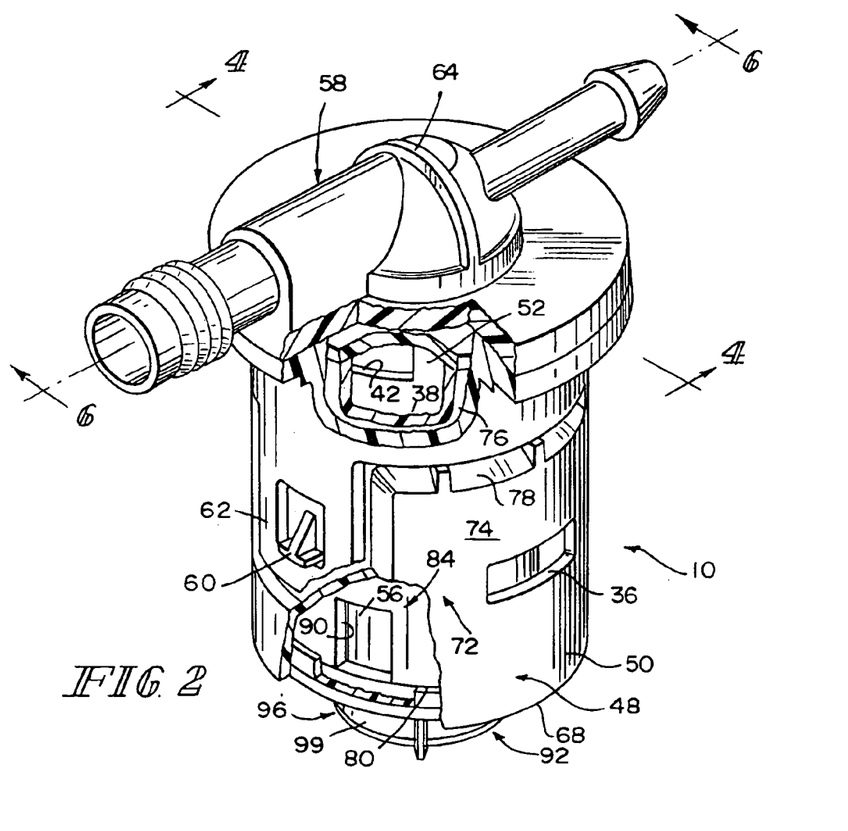
FIG. 2 is a perspective view, with portions broken away, of the vent apparatus showing various ports formed in the vent apparatus to cause liquid fuel entrained in fuel vapor flowing through the ports to be shed from the fuel vapor to minimize excessive "carryover" of liquid fuel to the fuel vapor recovery canister.
Figure 3:
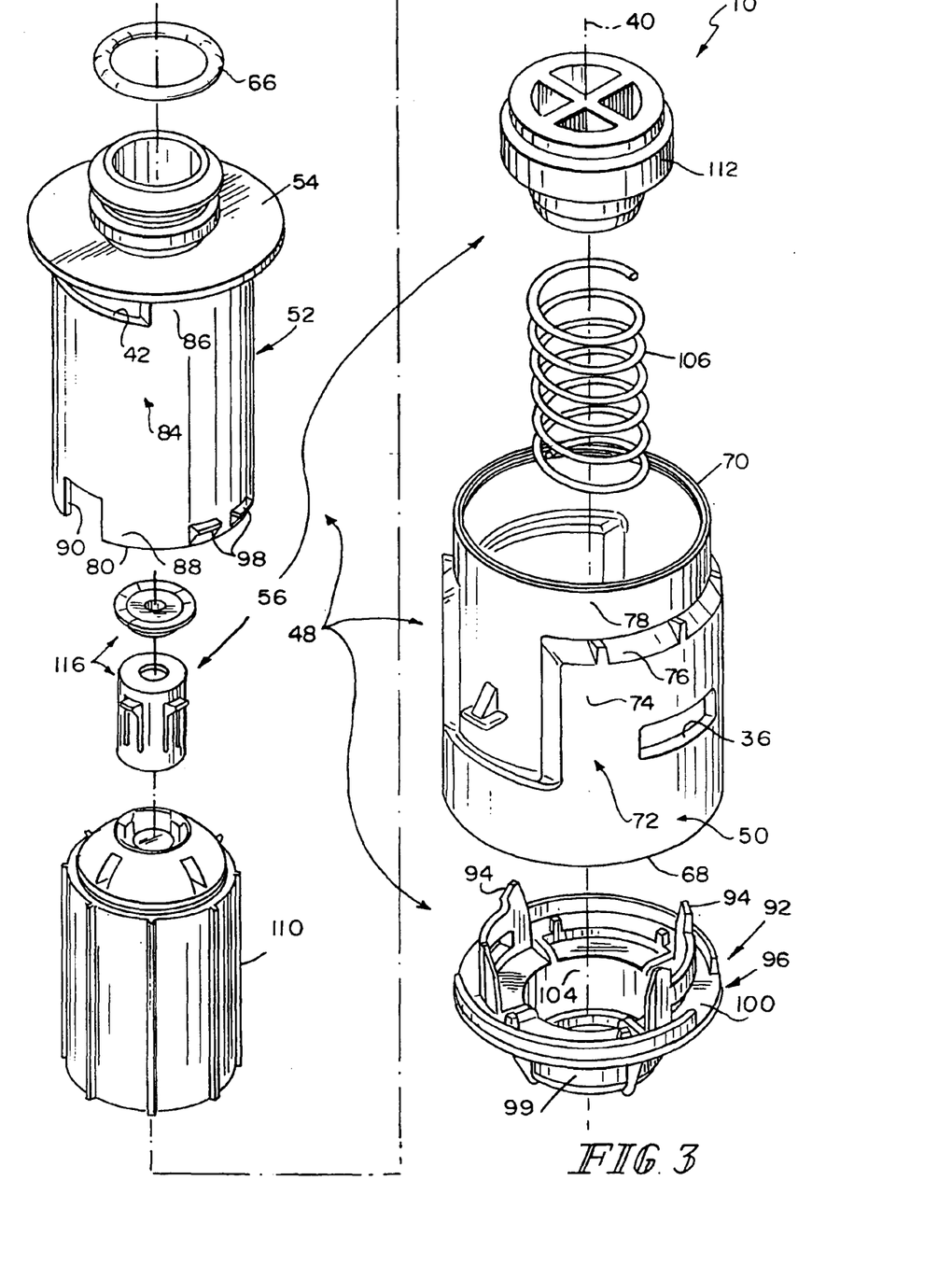
FIG. 3 is an exploded perspective view showing components of the vent apparatus.

A fuel tank vent apparatus 10 is mounted in an aperture 12 formed in a top wall 14 of a fuel tank 16 to regulate flow of pressurized fuel vapor from a vapor space 18 provided in tank 16 to a fuel vapor recovery canister 20 through a discharge conduit 22, as shown, for example, in FIG. 1. Vent apparatus 10 is configured to cause fuel vapor traveling therethrough to shed liquid fuel entrained therein and to collect such liquid fuel in a liquid fuel accumulation chamber 24 shown in FIGS. 4 and 6 and formed in a lower portion of vent apparatus 10. Thus, vent apparatus 10 acts as a liquid fuel carryover filter to prevent excessive amounts of liquid fuel from exiting tank 16 through discharge conduit 22 and then reaching the fuel vapor recovery canister 20 coupled to discharge conduit 22.

A filler neck 26 is coupled to fuel tank 16 and formed to include an inlet 28 sized to receive a fuel-dispensing pump nozzle 30 as shown, for example, in FIG. 1. Nozzle 30 is used by a pump operator to introduce liquid fuel 32 into fuel tank 16 during vehicle refueling. As tank 16 is filled during refueling, the top surface 33 of liquid fuel 32 will rise in direction 34 as shown in FIG. 1. Once tank 16 is filled with fuel, a valve will move to a closed position blocking further flow of fuel vapor from vent apparatus 10 to canister 20 through discharge conduit 22. At this stage of refueling, because pressurized fuel vapor extant in fuel tank 16 is unable to vent to canister 20 through discharge conduit 22, the pressure inside tank 16 will rise sharply to exceed the pressure of liquid fuel 32 flowing into tank 16 through filler neck 26, causing liquid fuel flow in filler neck 26 to slow or "hesitate" and splash a fill-limit sensor 31 on pump nozzle 30 to shut off fuel flow from nozzle 30.

Figure 4:
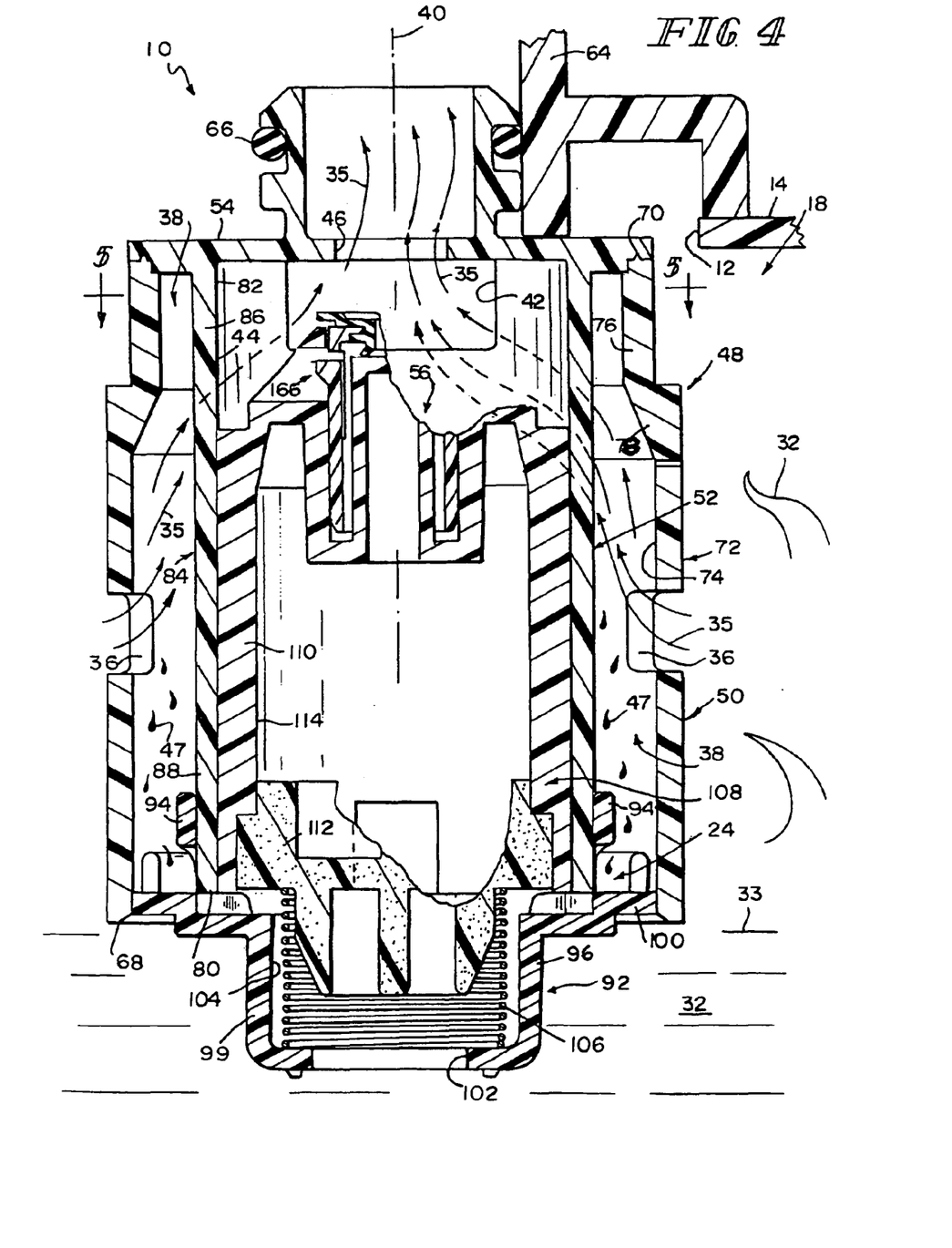
FIG. 4 is a sectional view taken along lines 4—4 of FIG. 2 showing fuel vapor flowing from a vapor space in the fuel tank through a pair of fuel vapor transfer ports into an annular fuel vapor transfer passageway through which the fuel vapor flows upwardly and circumferentially to a fuel vapor inlet port so that liquid fuel entrained in fuel vapor is shed therefrom and showing fuel vapor flowing from the fuel vapor inlet port through a valve chamber containing a valve in an opened position to a fuel vapor outlet port for delivery to the fuel vapor recovery canister.
Figure 5:
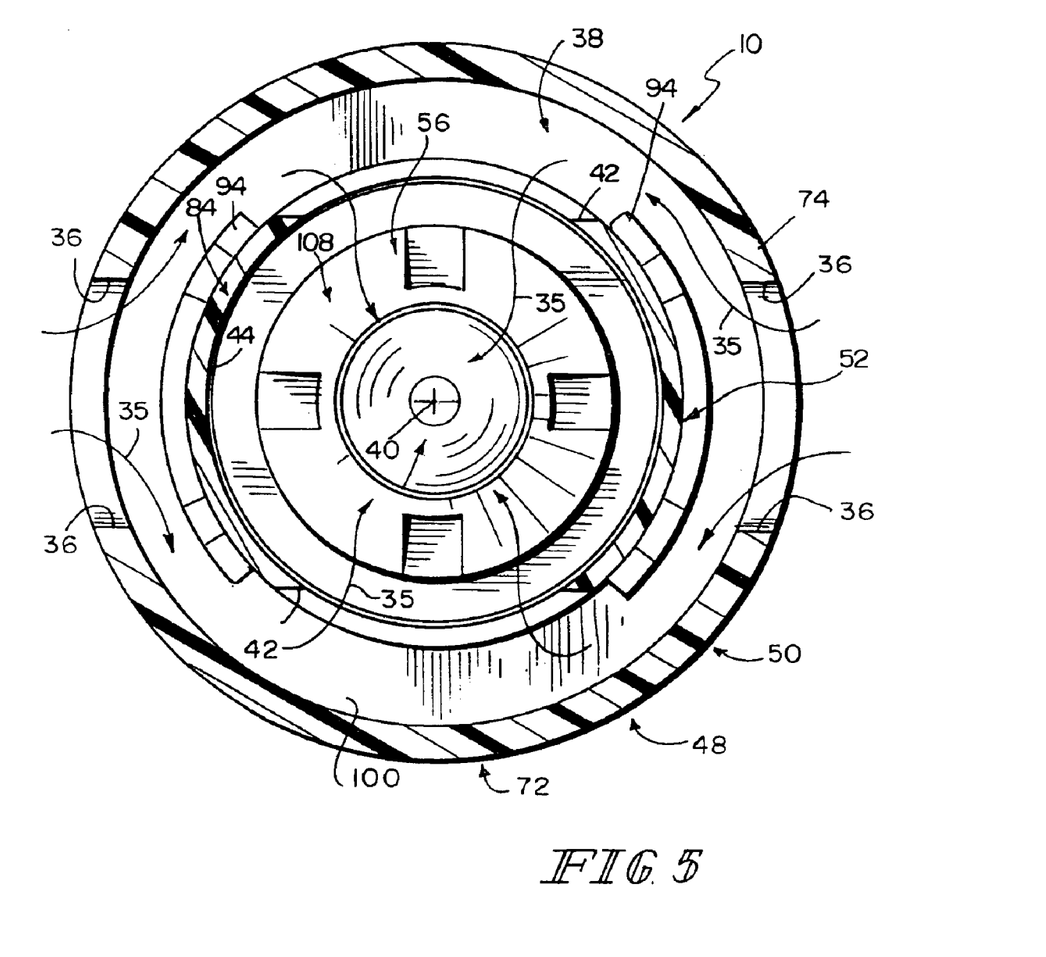
FIG. 5 is a sectional view taken along lines 5—5 of FIG. 4 showing a flow of fuel vapor, in series, from the tank vapor space through the pair of fuel vapor transfer ports, the annular fuel vapor transfer passageway, and a pair of fuel vapor inlet ports rotated 90° relative to the fuel vapor transfer ports into the valve chamber.
Figure 6:
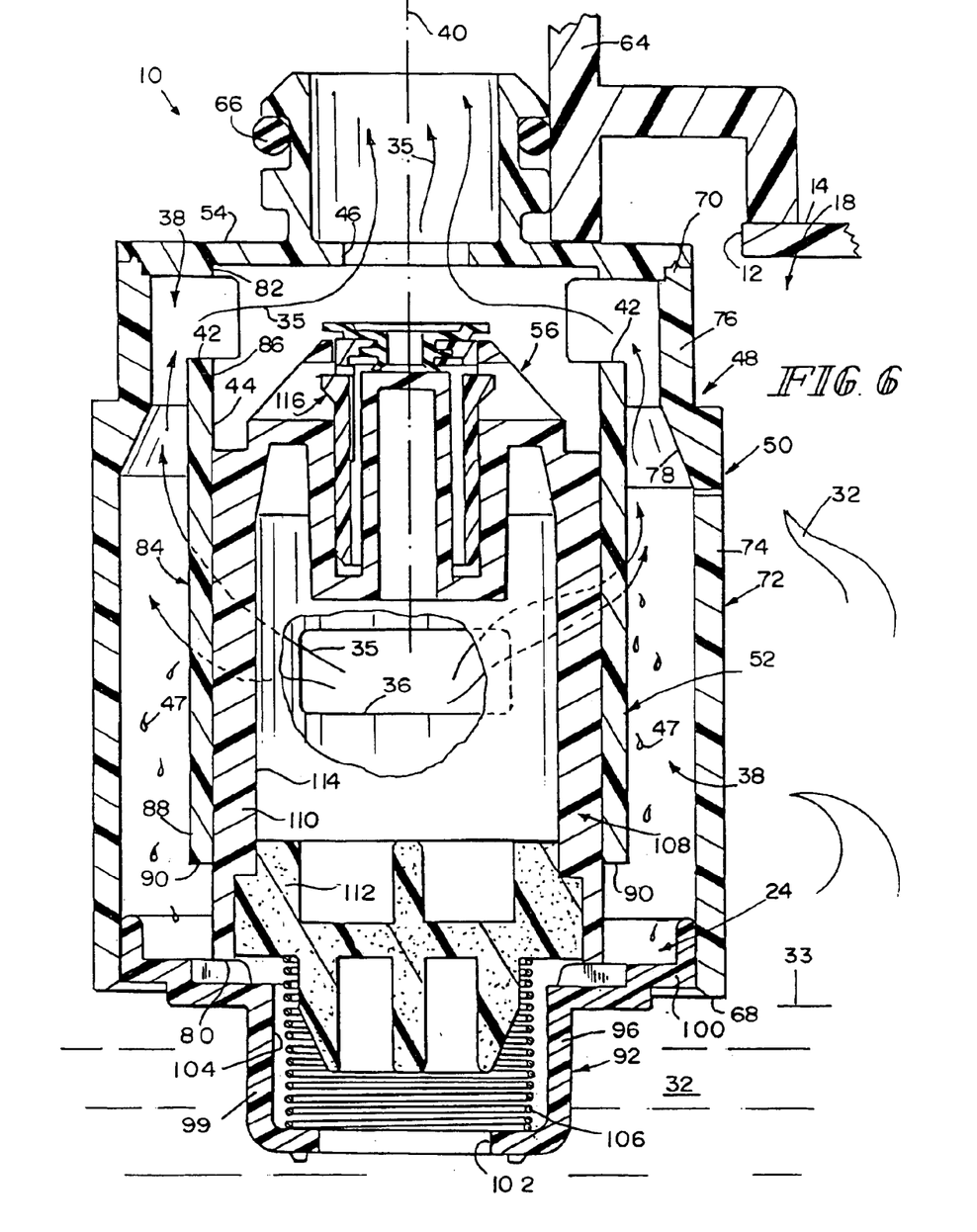
FIG. 6 is a sectional view taken along lines 6—6 of FIG. 2 showing fuel vapor flowing from one of the fuel vapor transfer ports through the fuel vapor transfer passageway upwardly and circumferentially to the fuel vapor inlet ports to shed liquid fuel entrained in fuel vapor and showing fuel vapor flowing from the fuel vapor inlet ports through the valve chamber for discharge through the fuel vapor outlet ports.

Vent apparatus 10 is configured to demoisturize fuel vapor 35 to prevent excessive amounts of liquid fuel 32 from discharging from vent apparatus 10 and flowing to canister 20. Vent apparatus 10 conducts fuel vapor along a flow path that changes directions so as to cause liquid fuel 32 entrained in the fuel vapor to be shed therefrom, as shown in FIGS. 4–6. Liquid fuel 32 is shed from fuel vapor as fuel vapor flows from vapor space 18 laterally through at least one fuel vapor transfer port 36 into a fuel vapor transfer passageway 38, upwardly and circumferentially about a central axis 40 through the passageway 38, and laterally through at least one fuel vapor inlet port 42 into a valve chamber 44 for discharge therefrom through a fuel vapor outlet port 46. Droplets 47 of liquid fuel 32 shed from fuel vapor conducted along the direction-changing flow path are collected in liquid fuel accumulation chamber 24 and eventually discharged from vent apparatus 10 back into fuel tank 16.

Figure 7:
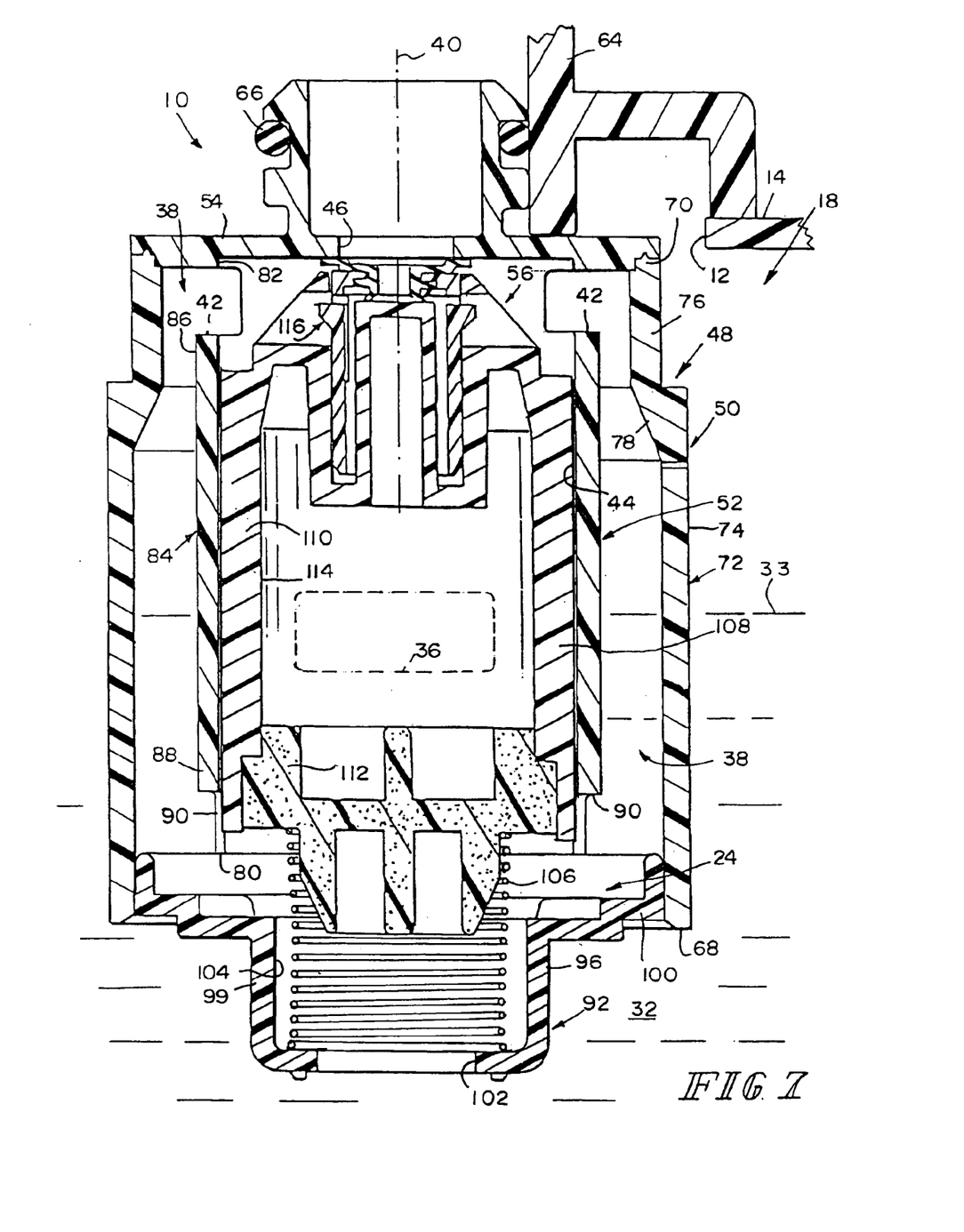
FIG. 7 is a sectional view similar to FIG. 6 showing the valve assuming a closed position blocking discharge of fuel vapor through the fuel vapor outlet ports in response to a rising level of fuel in the fuel tank.

Vent apparatus 10 includes a housing 48, as shown in FIGS. 2–7. Housing 48 includes an outer sleeve 50 and an inner sleeve 52 surrounded by outer sleeve 50. Outer and inner sleeves 50, 52 cooperate to define annular fuel vapor transfer passageway 38. Outer sleeve 50 is formed to include a pair of fuel vapor transfer ports 36. Inner sleeve 52 is formed to include a pair of fuel vapor inlet ports 42 and valve chamber 44. In the illustrated embodiment, transfer ports 36 are spaced circumferentially about 180° apart from one another and inlet ports 42 are spaced circumferentially about 180° apart from one another and about 90° apart from transfer ports 36. A plate 54 included in housing 48 is formed to include fuel vapor outlet port 46 which is to be opened and closed in response to movement of a valve 56 between an opened position allowing flow of fuel vapor 35 from valve chamber 44 through fuel vapor outlet port 46, as shown in FIGS. 4–6, and a closed position blocking flow of fuel vapor 35 from valve chamber 44 through fuel vapor outlet port 46, as shown in FIG. 7.

The vent apparatus 10 may be mounted to top wall 14 in a variety of ways. In the illustrated embodiment, housing 48 is mounted to an outlet 58 included in vent apparatus 10 and mounted to top wall 48. A pair of detents 60 coupled to outer sleeve 50 snaps into a pair of connector portions 62 extending downwardly from a fuel vapor conductor portion 64 mounted to top wall 48. An O-ring 66 provides a seal between plate 54 and fuel vapor conductor portion 64.

Outer sleeve 50 includes lower and upper ends 68, 70 and a side wall 72 extending therebetween, as shown in FIGS. 3, 4, 6, and 7. Upper end 70 is mounted to plate 54. Side wall 72 includes a lower portion 74, an upper portion 76, and a transition portion 78. Lower portion 74 is formed to include fuel vapor transfer ports 36. In the illustrated embodiment, transfer ports 36 are perforations formed in lower portion 74.

Lower portion 74 has a larger inner diameter than upper portion 76, as shown in FIGS. 4, 6, and 7. Transition portion 78 tapers radially inwardly from lower portion 74 to upper portion 76. Upper portion 76 and transition portion 78 thus narrow passageway 38 which causes fuel vapor 35 to accelerate as it flows from transfer ports 36 upwardly and circumferentially through passageway 38 and laterally through inlet ports 42, thereby promoting shedding of liquid fuel 32 from fuel vapor 35.

Inner sleeve 52 includes lower and upper ends 80, 82 and a cylinder-shaped side wall 84 extending therebetween, as shown in FIGS. 3, 4, 6, and 7. Upper end 80 is mounted to plate 54. In the illustrated embodiment, inner sleeve 52 and plate 54 are monolithic.

An upper portion 86 of inner sleeve 52 is formed to include the fuel vapor inlet ports 42. In the illustrated embodiment, inlet ports 42 are perforations formed in upper portion 86.

Fuel vapor transfer ports 36 are positioned lower than the fuel vapor inlet ports 42. As such, fuel vapor transfer ports 36 are positioned farther from plate 54 than fuel vapor inlet ports 42. Optionally, fuel vapor transfer ports 36 and fuel vapor inlet ports 42 are positioned at the same level so that transfer ports 36 and inlet ports 42 are positioned the same distance from plate 54.

A lower portion 88 of inner sleeve 52 is formed to include a pair of drain ports 90, as shown in FIGS. 2, 3, 6, and 7. Drain ports 90 arranged to drain liquid fuel 32 from liquid fuel accumulation chamber 24. Drain ports 90 are spaced circumferentially about 180° apart from one another. Each drain port 90 is aligned vertically with an inlet port 42. As such, drain ports 90 are spaced circumferentially about 90° apart from transfer ports 36. In the illustrated embodiment, each drain port 90 is defined by a notch formed in lower portion 88.

Housing 48 includes a retainer 92, as shown in FIGS. 1–4, 6, and 7. Retainer 92 includes a pair of connectors 94 and a bottom plate 96. Each connector 94 snaps onto a pair of detents 98 coupled to lower portion 88 of inner sleeve 52 to mount retainer 92 to inner sleeve 52.

Bottom plate 96 includes a cup 99 and an annular flange 100 extending radially outwardly from cup 99, as shown in FIGS. 3, 4, 6, and 7. Flange 100 cooperates with lower portions 74, 88 of outer and inner sleeves 50, 52 to define liquid fuel accumulation chamber 24. As such, bottom plate 96 and lower portions 74, 88 cooperate to define reservoir means for providing liquid fuel accumulation chamber 24 to receive liquid fuel droplets 47 present in fuel vapor transfer passageway 38. Cup 99 depends from flange 100 and is formed to include a liquid fuel transfer port 102 arranged to admit liquid fuel 32 into a spring chamber 104 formed in cup 99 and to discharge liquid fuel 32 from spring chamber 104.

A spring 106 is positioned in spring chamber 104 underneath valve 56, as shown in FIGS. 4, 6, and 7. Spring 106 is arranged to assist upward movement of valve 56 from its opened position to its closed position upon rising of the level of liquid fuel 32 in tank 16.

In the illustrated embodiment, valve 56 includes a buoyant float 108 positioned on spring 106, as shown in FIGS. 3–7. Buoyant float 108 includes a shell 110 and a plug 112 coupled to an end of shell 110. Shell 110 and plug 112 define a closed air volume 114. The illustrated valve 56 further includes a reopening assistance device 116 arranged to bleed fuel vapor 35 through outlet port 46 to assist in reopening outlet port 46 after having been closed by valve 56.

Outer and inner sleeves 50, 52 cooperate to provide means for demoisturizing fuel vapor 35 admitted into valve chamber 44 through a fuel vapor inlet port 42 by providing fuel vapor transfer passageway 38 that is between outer sleeve 50 and inner sleeve 52 and is in communication with a fuel vapor transfer port 36 and fuel vapor inlet port 42 so that liquid fuel 32 entrained in fuel vapor 35 is shed therefrom as fuel vapor 35 flows laterally through fuel vapor transfer port 36 into fuel vapor transfer passageway 38, upwardly toward plate 54 and circumferentially about central axis 40 away from fuel vapor transfer port 36 through fuel vapor transfer passageway 38, and laterally through fuel vapor inlet port 42 into valve chamber 44 to produce a flow of demoisturized fuel vapor 35 flowing from fuel vapor transfer passageway 38 into valve chamber 44 for discharge through fuel vapor outlet port 46.

What is claimed is:

1. A fuel tank vent apparatus comprising a housing including an inner sleeve, a plate, and an outer sleeve, the inner sleeve being formed to include a valve chamber and a fuel vapor inlet port arranged to admit fuel vapor into the valve chamber, the plate being formed to include a fuel vapor outlet port arranged to discharge fuel vapor from the valve chamber, the outer sleeve being mounted to surround the inner sleeve and being formed to include a fuel vapor transfer port positioned farther below the plate than the fuel vapor inlet port and spaced circumferentially about a central axis of the housing from the fuel vapor inlet port, a valve mounted for movement in the valve chamber between an opened position allowing flow of fuel vapor from the valve chamber through the fuel vapor outlet port and a closed position blocking flow of fuel vapor from the valve chamber through the fuel vapor outlet port, and means for demoisturizing fuel vapor admitted into the valve chamber through the fuel vapor inlet port by providing a fuel vapor transfer passageway that is between the outer sleeve and the inner sleeve and is in communication with the fuel vapor transfer port and the fuel vapor inlet port so that liquid fuel entrained in fuel vapor is shed therefrom as fuel vapor flows laterally through the fuel vapor transfer port into the fuel vapor transfer passageway, upwardly toward the plate and circumferentially about the central axis away from the fuel vapor transfer port through the fuel vapor transfer passageway, and laterally through the fuel vapor inlet port into the valve chamber to produce a flow of demoisturized fuel vapor flowing from the fuel vapor transfer passageway into the valve chamber for discharge through the fuel vapor outlet port.

2. The fuel tank vent apparatus of claim 1, wherein the outer sleeve includes a lower portion formed to include the fuel vapor transfer port, an upper portion coupled to the plate and having a smaller inner diameter than the lower portion, and a transition portion tapering radially inwardly from the lower portion to the upper portion.

3. The fuel tank vent apparatus of claim 2, wherein the inner sleeve is cylinder-shaped and the inner and outer sleeves cooperate so that the fuel vapor transfer passageway is annular.

4. The fuel tank vent apparatus of claim 1, wherein the housing comprises reservoir means for providing a liquid fuel accumulation chamber to receive liquid fuel droplets present in the fuel vapor transfer passageway.

5. The fuel tank vent apparatus of claim 4, wherein the housing includes a bottom plate extending between lower portions of the inner and outer sleeves and the bottom plate and the lower portions of the inner and outer sleeves cooperate to define the reservoir means.

6. The fuel tank vent apparatus of claim 5, wherein a notch formed in the lower portion of the inner sleeve defines a drain port arranged to drain liquid fuel from the liquid fuel accumulation chamber.

7. The fuel tank vent apparatus of claim 1, wherein the inner sleeve includes upper and lower ends and a side wall extending therebetween, the upper end is coupled to the plate, and the fuel vapor inlet port is a perforation formed in the side wall.

8. The fuel tank vent apparatus of claim 1, wherein the outer sleeve includes upper and lower ends and a side wall extending therebetween, the upper end is coupled to the plate, and the fuel vapor transfer port is a perforation formed in the side wall.

9. A fuel tank vent apparatus comprising a housing including an inner sleeve, a plate, and an outer sleeve, the inner sleeve being formed to include a valve chamber and a fuel vapor inlet port arranged to admit fuel vapor into the valve chamber, the plate being formed to include a fuel vapor outlet port arranged to discharge fuel vapor from the valve chamber, the outer sleeve being mounted to surround the inner sleeve and being formed to include a fuel vapor transfer port positioned farther below the plate than the fuel vapor inlet port and spaced circumferentially about a central axis of the housing from the fuel vapor inlet port, and a valve mounted for movement in the valve chamber between an opened position allowing flow of fuel vapor from the valve chamber through the fuel vapor outlet port and a closed position blocking flow of fuel vapor from the valve chamber through the fuel vapor outlet port, wherein the inner and outer sleeves provide a fuel vapor transfer passageway that is between the inner and outer sleeves and in communication with the fuel vapor transfer port and the fuel vapor inlet port so that liquid fuel entrained in fuel vapor is shed therefrom as fuel vapor flows laterally through the fuel vapor transfer port into the fuel vapor transfer passageway, upwardly toward the plate and circumferentially about the central axis away from the fuel vapor transfer port through the fuel vapor transfer passageway, and laterally the fuel vapor inlet port into the valve chamber to produce a flow of demoisturized fuel vapor flowing from the fuel vapor transfer passageway into the valve chamber for discharge through the fuel vapor outlet port.

10. The fuel tank vent apparatus of claim 9, wherein the fuel vapor transfer port and the fuel vapor inlet port are spaced circumferentially about 90° apart from one another.

11. The fuel tank vent apparatus of claim 9, wherein the outer sleeve is formed to include another fuel vapor transfer port, the fuel vapor transfer ports are spaced circumferentially about 180° apart from one another, the inner sleeve at least partially defines another fuel vapor inlet port, the fuel vapor inlet ports are spaced circumferentially about 180° apart from one another, and the fuel vapor transfer ports are spaced circumferentially about 90° apart from the fuel vapor inlet ports.

12. The fuel tank vent apparatus of claim 9, wherein the housing includes a bottom plate extending between lower portions of the inner and outer sleeves and the bottom plate and the lower portions of the inner and outer sleeves cooperate to define an annular liquid fuel accumulation chamber arranged to receive liquid fuel shed from fuel vapor flowing through the fuel vapor transfer passageway.

13. The fuel tank vent apparatus of claim 12, wherein a notch formed in the lower portion of the inner sleeve defines a drain port arranged to drain liquid fuel from the liquid fuel accumulation chamber.

14. The fuel tank vent apparatus of claim 13, wherein the drain port and the fuel vapor inlet port are aligned vertically with one another.

15. The fuel tank vent apparatus of claim 9, wherein each of the inner and outer sleeves includes upper and lower ends and a side wall extending therebetween, each upper end is coupled to the plate, the fuel vapor inlet port is a perforation formed in the side wall of the inner sleeve, and the fuel vapor transfer port is a perforation formed in the side wall of the outer sleeve.

16. A fuel tank vent apparatus comprising a housing including a cylinder-shaped inner sleeve, a plate, and an outer sleeve, the inner sleeve including upper and lower ends and a side wall extending therebetween, the side wall of the inner sleeve being formed to include a chamber and a fuel vapor inlet port arranged to admit fuel vapor into the chamber, the plate being formed to include a fuel vapor outlet port arranged to discharge fuel vapor from the chamber, the outer sleeve including upper and lower ends and a side wall extending therebetween and around the wall of the inner sleeve and including a lower portion, an upper portion positioned closer to the plate than the lower portion and having a smaller inner diameter than the upper portion, and a transition portion tapering radially inwardly from the lower portion to the upper portion, the lower portion being formed to include a fuel vapor transfer port positioned farther below the plate than the fuel vapor inlet port and spaced circumferentially about a central axis of the housing from the fuel vapor inlet port, wherein the side walls of the inner and outer sleeves provide an annular fuel vapor transfer passageway in communication with the fuel vapor transfer port and the fuel vapor inlet port so that liquid fuel entrained in fuel vapor is shed therefrom as fuel vapor flows laterally through the fuel vapor transfer port into the fuel vapor transfer passageway, upwardly toward the plate and circumferentially about the central axis away from the fuel vapor transfer port through the fuel vapor transfer passageway, and laterally through the fuel vapor inlet port into a valve chamber.

17. The fuel tank vent apparatus of claim 16, further comprising a valve mounted for movement in the chamber between an opened position allowing flow of fuel vapor from the chamber through the fuel vapor outlet port and a closed position blocking flow of fuel vapor from the chamber through the fuel vapor outlet port.

18. The fuel tank vent apparatus of claim 16, wherein the transition portion is positioned farther below the plate than the fuel vapor inlet port.

19. The fuel tank vent apparatus of claim 16, wherein the housing includes a bottom plate extending between the lower ends of the side walls of the inner and outer sleeves and the bottom plate and the lower ends cooperate to define an annular liquid fuel accumulation chamber arranged to receive liquid fuel shed from fuel vapor flowing through the fuel vapor transfer passageway.

20. The fuel tank vent apparatus of claim 16, wherein the upper ends of the inner and outer sleeves are coupled to the plate.

* * * * *